United States Patent Office 3,442,633
Patented May 6, 1969

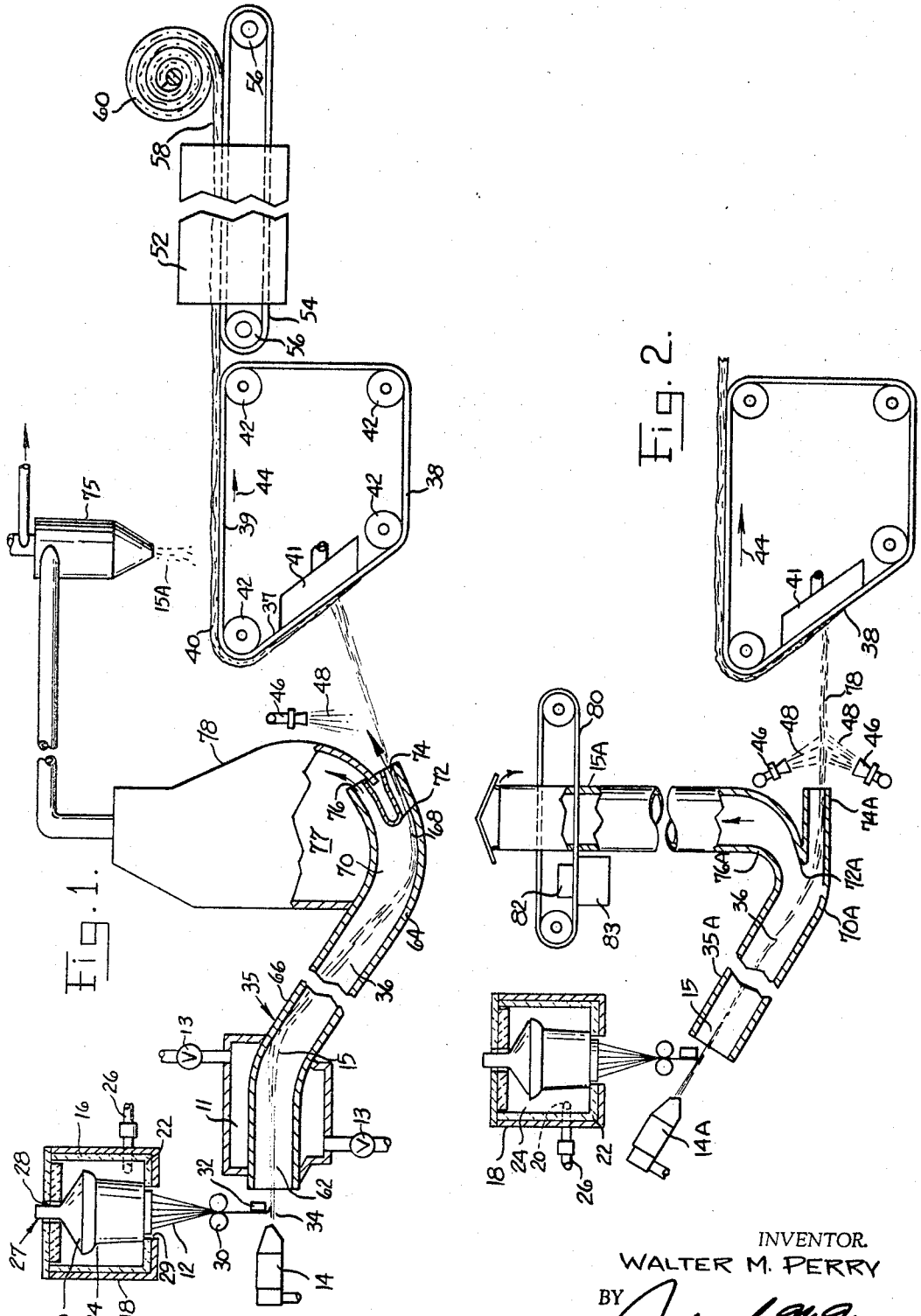

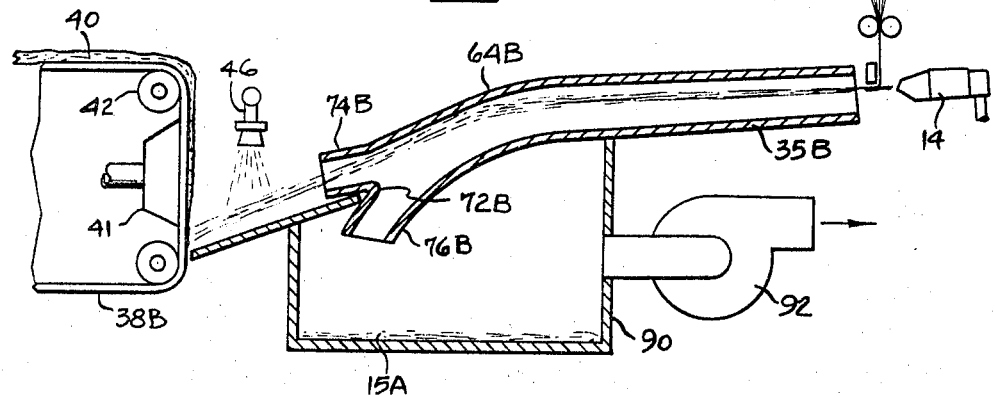
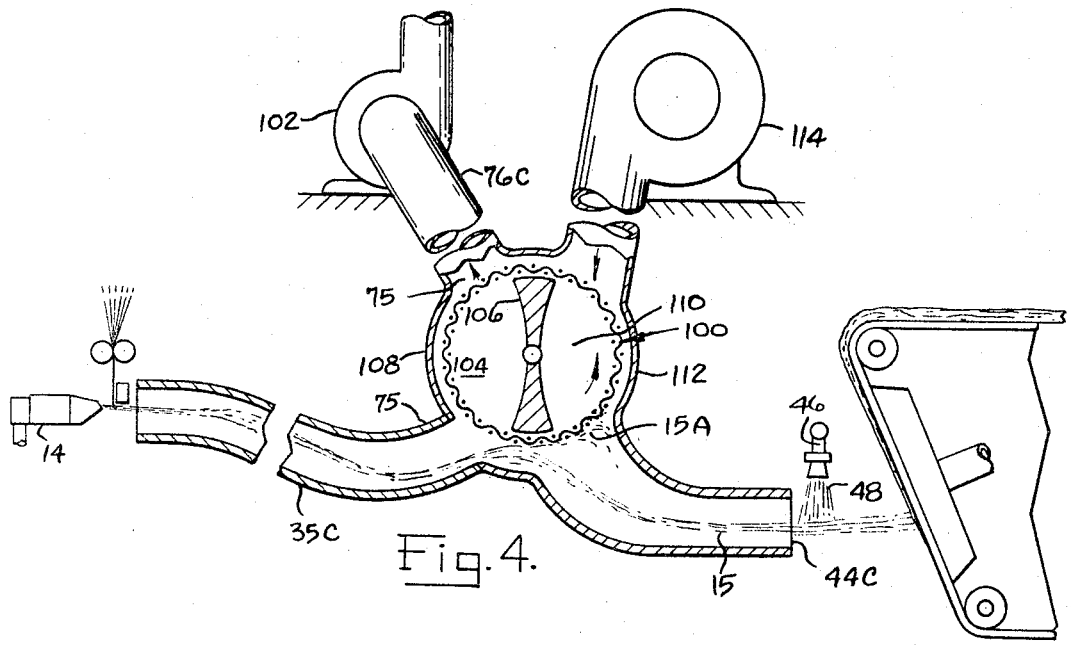

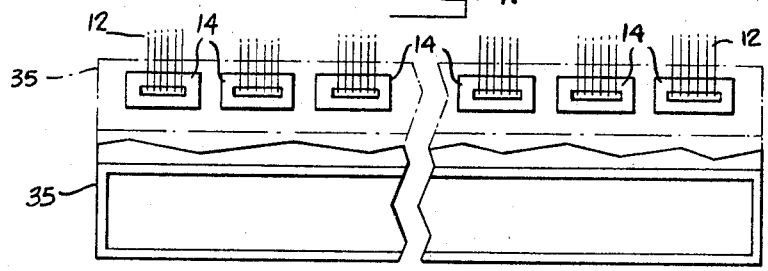
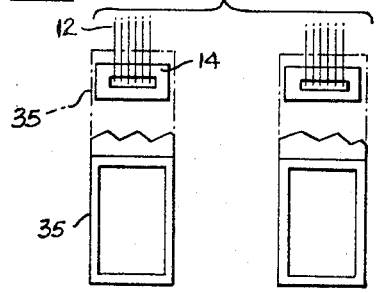
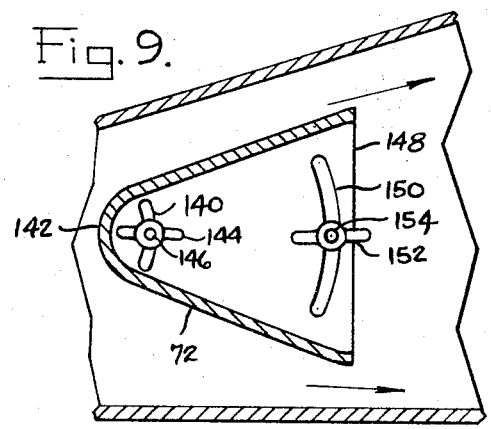
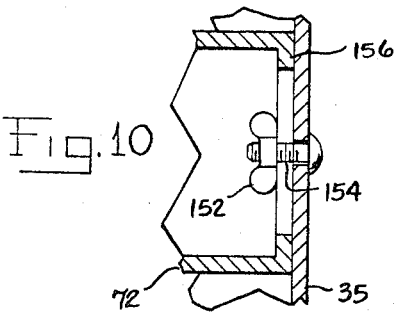
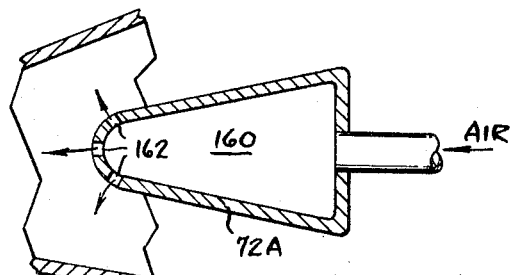
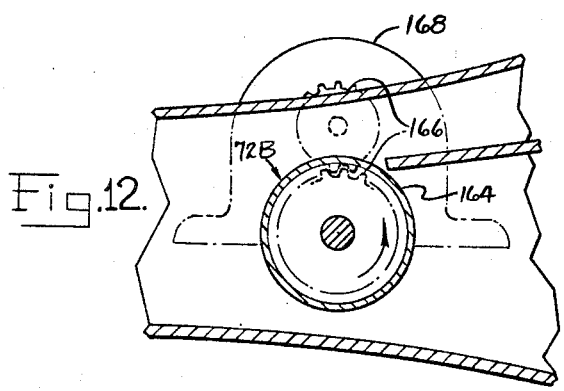

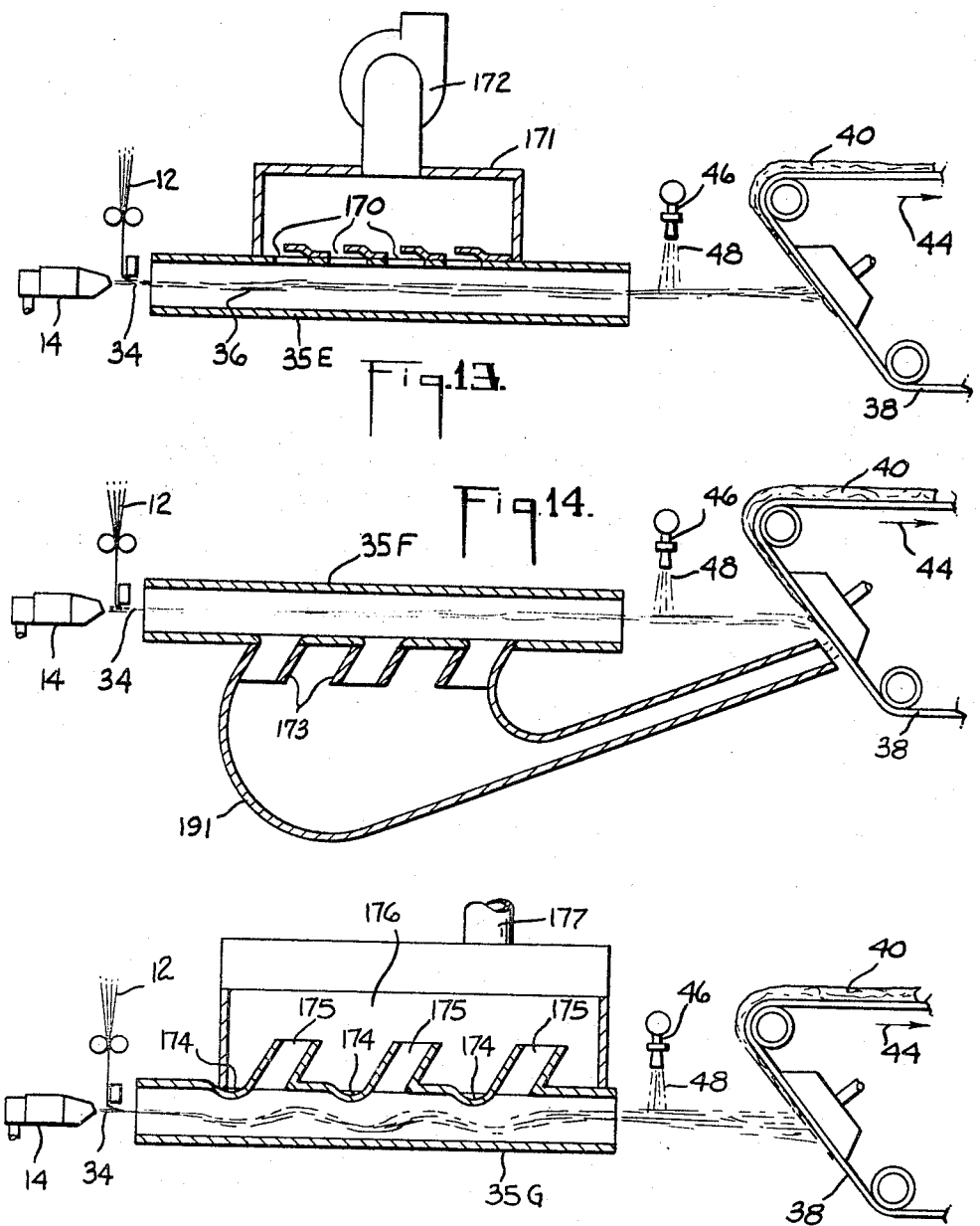

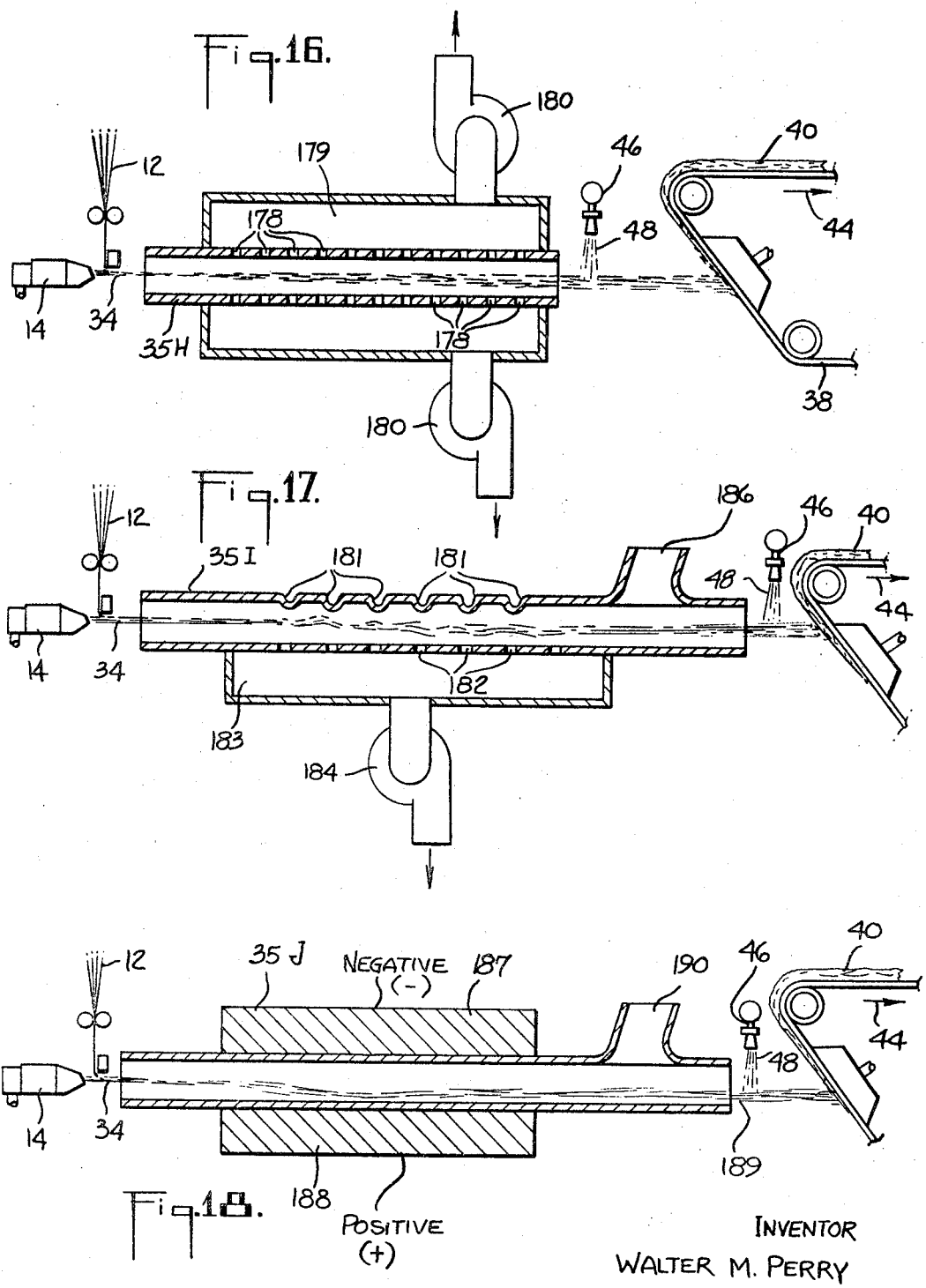

3,442,633
METHOD AND APPARATUS FOR CONVEYING AND FOR TREATING GLASS FIBERS
Walter Merton Perry, 76 Locust Hill Road,
Darien, Conn. 06820
Continuation-in-part of application Ser. No. 608,942, Jan. 12, 1967, which is a continuation of application Ser. No. 335,012, Jan. 2, 1964. This application Dec. 29, 1967, Ser. No. 701,522
Int. Cl. C03b *37/02;* B29c *23/00*
U.S. Cl. 65—3          13 Claims

ABSTRACT OF THE DISCLOSURE

Method of inhibiting thermally activated changes in thermally sensitive materials when applied to mineral fibers entrained in a hot gaseous medium comprising separating a portion of the hot gases without disrupting the entrained fibers, and apparatus for effecting the separation.

---

This application is a continuation-in-part of my copending application Ser. No. 608,942, filed Jan. 12, 1967, and now abandoned, which in turn is a continuation of my then copending but now abandoned application Ser. No. 335,012, filed Jan. 2, 1964.

BACKGROUND OF THE INVENTION

This invention relates generally to the conveying of particulate mineral materials in relatively hot gaseous streams and the treatment thereof or application thereto of a thermally activated or modifiable material while suspended in the hot stream. More specifically, the invention relates to the conveying and treating of fibers formed from heat softenable materials, such as flame attenuated glass fibers, and the introduction of thermally sensitive materials. In a further aspect, this invention relates to a novel method and apparatus for conveying inorganic fibers in a relatively hot gaseous stream and for separating a portion of the hot gaseous stream without materially interrupting the flow of fibers. In a still further aspect this invention relates to a novel method and apparatus for cooling a fiber conveying stream to deter the precuring of heat curable binder treating material applied to the fiber while suspended in a stream.

While the invention is generally applicable to the suspension and conveying of various types of particulate mineral material in hot gaseous streams where normally excessive temperatures or available heat might be disadvantageous, the invention is of particular utility in the attenuation, conveying and treating of glass fibers during their formation into felts or mats and hence will be particularly described in that connection.

One present method of producing glass fibers of the staple or wool type comprises providing a body of molten glass, and withdrawing a stream of glass from the molten body, and solidifying the stream to form a rod or primary filament. Thereafter, an advancing end of the solidified rod is subjected to a gaseous blast of intense heat and high velocity. The advancing end of the glass rod is softened by the intensity of the heat of the blast and the high velocity of the blast draws out and attenuates the softened end of the rod into a very fine fiber. The fibers are thus entrained in the gaseous stream generated by the blast and carried to a collection means such as a foraminous belt assisted by reduced atmospheric pressure where they are retrieved from the gaseous stream and formed into a mat. Disposed adjacent to the gaseous stream are one or more applicators which are adapted to apply treating material such as a liquid binder solution onto the fibers before they are collected in mat form. In the prior art methods of making mats the high heat content of the gaseous stream frequently effects preactivation of the thermally sensitive material such as a thermosetting resin binder. Various attempts to obviate the preactivation of the thermally sensitive material resulted in lower production rates.

Also, as production rates are increased, the increased volume of gases from expanded flame blast attenuating means which must be handled becomes so great as to make its collection difficult and require suction blowers of excessive size.

SUMMARY OF THE INVENTION

This invention comprises the separation, through various means given, of a substantial portion of the hot gases from a stream of hot gases carrying entrained mineral fiber, without appreciably disrupting the flow of fibers, to reduce the overall heat content of the residual stream comprising the remaining hot gases and the fiber content and thereby minimize preactivation of heat sensitive materials applied to the fibers while yet entrained within the hot gases of the stream as in the common spraying of a thermosetting resin binder upon flame attenuated glass fibers just prior to their collection from the attenuating flame blast and formation into a bonded fibrous mat. Thus in the case of thermosetting resin bonded mineral fiber mats, the invention effectively inhibits the presetting of the binder either on the yet gas suspended and in turn substantially individual fibers, or on the belt collected fibers with the resultant loss of binder capacity and permits maximum activation or setting of the thermosetting binder following collection of the fibers from the dispersing gaseous medium and their formation into a felted body or interconnected fiber mat of designed characteristic with resulting optimum strength in relation to the total quantity of binder applied. And since the fibers accumulated on the collection belt do not necessarily constitute a body or felt of the characteristics desired such as to density or thickness, it may be required to modify the initially accumulated mass of fiber as by puffing out for a lower density body than collected on the belt, or by compressing to increase density. Such modifications following collection should take place prior to any effective curing of the binder since substantial precuring and thus joining of the individual fiber into a body of fixed characteristics inhibits the subsequent effecting of changes therein, or on the other hand the effecting of changes destroys the precured bonds reducing strength and integrity of the fiber body.

It is the principal object of this invention to provide a new and improved method, and means of carrying out the same, for reducing the overall heat content of hot gaseous streams containing entrained particulate mineral material to achieve the most effective treatment with or application of thermally sensitive material to the particulate mineral material and/or to effectively increase production rates by enabling the utilization of additional or expanded sources of the hot gaseous stream and in turn added quantity of hot gases and corresponding added heat without incurring the commensurate adverse effects thereof.

BRIEF DESCRIPTION OF THE DRAWINGS

This invention will be more fully understood and further objects and advantages thereof will appear from the following description of the method and various means of carrying out the method and from the accompanying drawings in which alternate embodiments of similar elements are designated by the addition of suffix letters:

FIG. 1 is a schematic elevational representation of mat making apparatus which includes an embodiment of a guiding tube and a divider forming a part of this invention;

FIG. 2 is a view similar to FIG. 1 but of an alternate embodiment of guiding tube;

FIG. 3 is a schematic view of a further alternate embodiment of guiding tube;

FIG. 4 is a schematic view of a still further alternate embodiment of guiding tube which includes a revolvable screen;

FIG. 7 is a schematic representation of a plurality of attenuating burners projecting fibers into a common guiding tube;

FIG. 8 is a schematic representation illustrating the manner in which a plurality of burners project fibers, each to a separate corresponding guiding tube but to a common mat collection device;

FIG. 9 is a view illustrating the manner in which a guiding tube divider may be mounted for selective adjustment;

FIG. 10 is a fragmentary transverse sectional view of the divider shown in FIG. 9;

FIGS. 11 and 12 are elevational views of alternate embodiments of guiding tube dividers;

FIG. 13 is a schematic view of a straight tube embodiment of the invention;

FIG. 14 is a schematic view of a similar straight tube device operating on static pressure;

FIG. 15 is a schematic view of a baffled straight tube apparatus which deflects the fiber flow;

FIG. 16 is a schematic view of a variation which does not alter the fiber flow;

FIG. 17 is a schematic view of a further variation which produces a deflection of the fiber flow; and FIG. 18 is a schematic view of an embodiment employing electrostatic forces.

DESCRIPTION OF THE PREFERRED EMBODIMENTS

Figure 5:
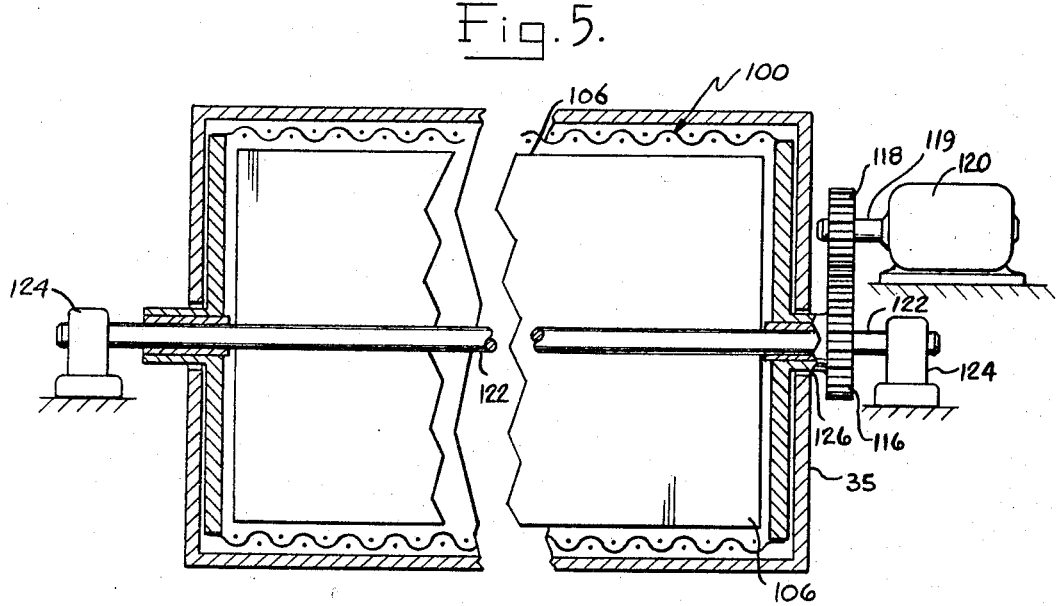
FIG. 5 is a transverse view of the revolvable screen shown in FIG. 4 together with power motive means.

As shown in FIG. 1, one type of typical apparatus adapted to the production of glass fiber mats includes a glass melting chamber 10. This chamber is heated by means of gaseous combustion products, and provides means whereby a body of molten glass can be produced, from which the primary glass filaments 12 can be formed and from which filaments, through the use of the burner 14, fine glass fibers 15 can be produced. It will be understood that other suitable heating means may also be employed for melting the glass. In the exemplary embodiment disclosed in FIG. 1, the melting chamber 10 is suitably fabricated of a high temperature resistant refractory clay and is enclosed within a refractory casing 16. The refractory casing 16 is supported in space on a suitable frame, not shown, around the glass melting chamber 10 by means of a thin metal shell 18. An opening 20 is provided through the metal shell 18 and the refractory casing 16 near the base 22 thereof and into such opening 20 there is inserted a gas conduit 26 for the introduction of a combustible gaseous mixture through the wall of the refractory casing 16. An annular combustion space 24 is defined between the outside surface of the wall of the melting chamber 10 and the inside surface of the wall of the refractory casing. The combustible gaseous mixture is burned in the annular combustion space 24 to provide heat to the walls of the glass melting chamber 10 to melt glass increments introduced into the melting chamber 10 through inlet throat 27. Exhaust gases are vented out through the top of the refractory casing 16 through an appropriate vent opening 28.

The refractory casing 16 is provided with a base 22 having a circular opening 29 of somewhat smaller diameter than the base of the melting chamber 10 and the melting chamber is positioned thereon in coaxial alignment whereby streams of glass exuded from small orifices in the base of the melting chamber 10 can pass downwardly in unrestricted flow. These streams of glass 12 radiate their heat to the atmosphere and thus become solidified into primary filaments 12. The primary filaments 12 are gathered and directed between a pair of rolls 30 whereby they are pulled downwardly. The pull rolls 30 thus provide the attenuating force and proper speed for forming primary filaments 12 of desired diameter. The primary filaments 12 are directed downwardly behind a guide block 32 which is provided on its rear face with a plurality of vertically disposed parallel line guide grooves (not shown), into which the primary filaments 12 are fitted and thereby retained in proper alignment for presentation to a hot gaseous blast 34.

Rearwardly of the guide block 32 there is positioned the burner 14 which is adapted to produce the gaseous blast 34 of intense heat and relatively high velocity to contact the advancing ends of the primary filaments 12. The intense heat of the blast 34 produced by the burner 14 is effective to soften the advancing ends of the primary filaments 12 sufficiently for attenuation. A relatively high velocity of the blast 34 is effected to draw out and attenuate the softened and advancing ends and thereby form fine glass fibers 15 of high coherency and high tensile strength which are of relatively long length and the bodies of which are of undulating character whereby said fibers when in mat form are held in felted contacting relation with each other.

The fibers 15 are entrained within and carried by the gaseous stream 36 generated by the blast 34 plus inspirated air drawn into the open end of the tube by reason of the high velocity jet from blast 34 through the stream guiding tube 35 to a foraminous collection belt 38 and collected thereon as a mat 40. A suction box 41, connected to suitable suction creating means such as positioned behind the collecting flight 37 of the belt 38 to assist in the collection of the fibers 15. The belt 38 is supported upon a plurality of rollers 42, one or more of which is adapted to be powered by a source such as an electric motor, not shown. The belt 38 is thereby moved at a selected speed in a required direction, as indicated by the arrow 44.

At a point adjacent the area where the fiber 15 is collected, a spray nozzle 46 is provided for directing a spray of liquid binder solution 48, if desired, on the fibers 15 to coat the surfaces to aid in adhering them into a mat of desired properties.

As the belt 38 moves in the direction of the arrow 44 and the fibers 15 collect thereon, the mat 40 is gradually accumulated and formed on the collecting flight 37 and is withdrawn from the point of collection at a rate commensurate with the formation to provide a mat 40 of given ultimate thickness. The mat 40 proceeds to the effluent flight 39 of the collecting belt 38 and is removed therefrom and directed to an oven 52 wherein the previously applied binder 48 is cured to a solid state and thereby the structure of the mat 40 is stabilized.

The oven 52 is heated by any suitable means such as gas burners (not shown) to provide the requisite temperature for binder curing. The oven 52 is provided with a movable chain 54 to support the mat 40. The chain 54 is retained at its ends by rotatable rolls 56, one of which may be powered to drive and move the chain 54 through the oven 52 at a speed synchronized with the speed of the fiber collecting belt 38. As the finished mat 58 emerges from the curing oven 52, it can be suitably rolled as at point 60 for transportation to subsequent processing operations.

The guiding tube 35 in the preferred embodiment forms an important aspect of this invention as utilized in the aforedescribed process and apparatus and in the embodiment shown in FIG. 1 comprises a first portion 62 generally coaxial with the gaseous stream emanating from the gaseous blast 34 from burner 14. The guiding tube 35 then curves downwardly to form a section 64 where the fibers 15 strike the upper wall 66 of the guiding tube 35 and then are deflected downwardly and hug the curved bottom wall at 68 of the guiding tube 35. The guiding tube 35 then terminates in another curvilinear section 70 in which a dividing member 72 is inserted to define a fiber discharge nozzle 74 and a hot gas diversion discharge nozzle 76. Most of the fibers hug the bottom wall 68 and exit through the fiber discharge nozzle 74 of the guiding tube 35 whereas a considerable portion of the hot gaseous stream 36 which contains very little of the fibers 15 is diverted upwardly into a plenum chamber 77 from which the excess collected hot gases may be transferred to any useful application such as to heat the building, to provide means for preheating the combustion air for one or more of the burners 14 or to provide a source of hot air for the oven 52 to cure the binder on the mat 58. The guiding tube 35 is preferably of highly polished metal in order to reduce the friction between the walls of the tube and the fibers that might strike the walls.

In a guiding tube operated in conjunction with apparatus as above described, it has been found that when 45% of the air which passes through the guiding tube 35 is diverted through nozzle 76, the diverted portion of the stream contains only 1 or 2% of fibers. The 1 or 2% fiber may be suitably screened out in the plenum chamber if so desired or removed by means of a cyclone device 75 and returned to the belt 38.

The production rates in the prior art apparatus are limited because attempts to increase the input of gas into the burner employed to attenuate the fibers, or otherwise expand its capacity, results in higher temperatures or increased quantities of hot gases and available heat which accentuates the problem of precuring of the binder on the fibers. Also, the increased volume of gases and the volume of induced air passing through the guiding tubes may be too great for the suction box behind the collection conveyor to handle. As a result, the burners of necessity are often operated at a disadvantageous rate.

With the present preferred apparatus utilizing the guiding tube of the instant invention, the rate of production of fibers felts may be substantially increased without incurring degrading precuring of the binder through the separation of a substantial volume of the hot gases and air projected by the attenuating burners. By separating some of the gases from the stream in which the fibers are being projected less heat is available for the same volume of fibers and consequently there is less heat available to precure the binder when it is applied. Concomitantly, with the decrease in volume of the gaseous fluid stream, there is less likelihood of overcompacting the fibers on the collecting and mat forming conveyor and also less volume of gases for the suction box behind the collection conveyor to handle. In view of the fact that less volume of air per unit of time is required to be handled, small sized suction fans may be employed to provide a further cost advantage.

An illustration of the advantages and savings that are possible by employing the instant invention will now be described. If it is assumed that 650 cubic feet of gas is now consumed in a burner 14 to attenuate sufficient glass fibers 15 from a single melting chamber 10 to produce 27 pounds of fibers per hour, theoretically 1080 cubic feet of gas should produce 45 pounds of fibers per hour. However, one of the limitations with current systems is that the available heat precures the binder 48 with the result that a compromise must be made. But, if 45% of the gas, and consequently the available heat, is diverted without materially interrupting the flow of the fibers 15, suspended in the stream 36, from their path to the collecting conveyor 38, as is possible in the system of the instant invention, only 55% of the heat, or 600 cubic feet in terms of gas, is available to act upon the binder 48. The available heat is thus considerably less than that (650 cubic feet) with the prior art mat making systems of similar size or capacity. Furthermore, if the same thickness of felt or mat 40 is to be produced the collection conveyor 38 can run approximately 67% faster than in the prior art methods.

If it is desired to additionally cool the entrance of guiding tube 35 from the high temperatures of the flame blast 34, cooling means may be provided adjacent to the entrance of the guiding tube 35. In FIG. 1, the additional cooling means is shown to be in the form of a separate passage 11 circumposing a portion of tube 35 and through which water or other fluid may be circulated. The circulation of the fluid may be suitably controlled by means such as valves 13 to effect control of the heat transfer between the gaseous stream through the tube 35 and the fluid stream being circulated through passage 11.

In FIG. 2 is schematically disclosed an alternate embodiment of the guiding tube arrangement. In this arrangement the tube 35A is inclined downwardly away from the burner 14A but initially in generally axial alignment therewith. At the terminal section 70A, the tube 35 curves back to define a discharge nozzle 74A which discharges the fibers 15 in a generally horizontal stream 78 toward the belt 38. Before the fibers 15 are projected into the discharge nozzle portion 74A, a portion of the gaseous stream 36 is diverted through a diverting passage defined by tube 76A for exhaustion to the outside atmosphere. The small amount of fibers that pass through tube 76A may be entrapped and removed from the exhausting hot gases by suitable means such as the traveling foraminous belt 80. As the fibers 15A entrapped on the belt 80 pass out of tube 76A, they may be removed by a source of pressurized air 82 and collected in bin 83.

In FIG. 3 is illustrated an embodiment wherein the guiding tube 35B may be arranged so that the fiber discharge nozzle 74B is positioned superjacent to the diverted outlet tube 76B. The main portion of tube 35B extends in substantially axial alignment with the blast emanating from burner 14, preferably about 3° from a horizontal line, and then forms a curvilinear section 64B extending in a generally downward direction. The discharge nozzle 74B curves away from the section 64B and toward the collection belt 38B. The guiding tube 76B continues in a downward direction away from section 64B and empties into chamber 90 where the small amount of fibers 15A carried by the diverted stream may be collected. The diverted air may be subsequently discharged from the chamber 90 by suitable means such as suction fan 92.

A further alternate embodiment is illustrated in FIG. 4. In the tube 35C adjacent to the entry 75 of the diverting tube 76C is positioned a rotating foraminous member 100. The diverted air stream passes through the perforations of the member 100 and is exhausted by means of suction fan 102 through the passage 104 defined by the stationary divider 106 and the casing wall 108. Any fiber fines 15A that are entrapped on the foraminous member 100 are subsequently rotated toward the passage 110 defined between the divider member 106 and the casing wall 112 where the fines 15A are blown off by the cold air being circulated through the passage 110 by blower fan 114. In addition to salvaging the fiber fines 15A, the introduction of the cold air provides supplementary means for further cooling the remaining hot gases and the fibers 15 before they are discharged through nozzle 44C and sprayed with binder 48.

FIG. 5 illustrates the manner in which divider 106 may be supported and driven interiorly of the member 100. At one lateral end of the tube 35 the divider 106 and foraminous member 100 are shown as being supported by the shaft 122 extending through support 124. The member 100 has an extension 126 which receives a gear 116 which is driven by gear 118 mounted on shaft 119 of motor 120. The divider 106 and member 100 at the opposite lateral end of tube 35 are similarly supported except that gears 116 and 118 and motor 120 are omitted.

Figure 6:
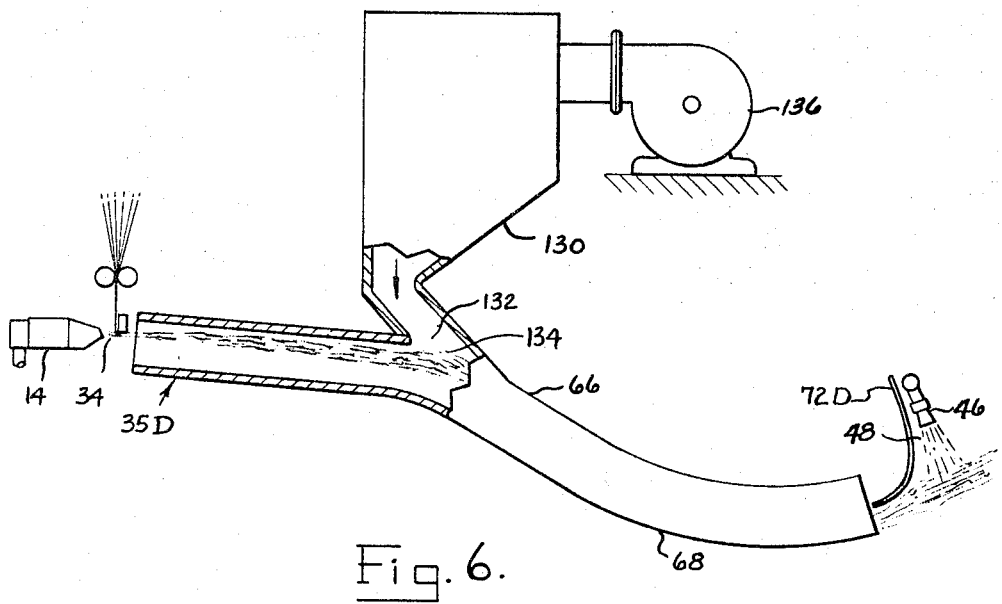
FIG. 6 is a schematic view of another alternate embodiment of guiding tube.

In the embodiment illustrated in FIG. 6, the guiding tube 35D is similar to the tube 35 shown in FIG. 1 except that an air cushion is provided to deter the friction otherwise created between the fibers 15 and the wall 66 of the tube 35D. The air cushion is created by the air discharging from the plenum chamber 130 through opening 132, preferably positioned at the area 134 where the fibers would otherwise normally strike the wall 66. Air is supplied to plenum 130 by suitable means such as fan 136. The air from plenum 130 deflects the fibers 15 away from wall 66 and toward opposing wall 68. In addition to deterring the friction between the fibers 15 and the wall 66 the air discharging from the plenum 130, under controlled conditions serves to cool the main air stream in which the fibers 15 are projected. Depending on the volume of air discharging from plenum 130 into tube 35D, the fibers 15 may be sufficiently cooled to prevent precuring of the binder 48 applied by nozzle 46 without the need of diverting any of the air from the main stream. However, if in any given installation it is found that the added air from plenum is not sufficient to adequately cool the fibers, a divider member 72D, such as shown in FIG. 6, may be provided at the terminal end of tube 35D for diverting some of the air stream without materially disrupting the flow of the fibers 15 from their path to the collection belt 38.

A further advantage of the arrangement shown in FIG. 6 is that the introduction of the additional air, in a direction generally in the same direction as the blast from the burners, tends to assist in the attenuation of the fibers from the primary filaments and produce longer fibers. With the additional air introduced in the described manner, there is more of a "pulling" effect on the primary filaments whereas the initial blast from the burner 14 tends to "push" the fibers 15.

FIG. 7 schematically illustrates the manner in which a plurality of burners 14 may be arranged to feed fibers 15 into a common guiding tube 35 discharging to a fiber collection belt. This arrangement of burners 14 may be employed in connection with any of the various embodiments of conveyor tubes illustrated in FIGS. 1–4 and 6, or any other various guiding tubes that may be suggested by this disclosure.

FIG. 8 schematically illustrates the manner in which a separate guiding tube 35 may be provided for each of a plurality of burners 14 feeding fibers 15 to a common fiber collection belt.

FIGS. 9 and 10 illustrate the manner in which a divider member 72 may be supported for selective adjustment. As shown in FIG. 9 a slot 140 is provided at the forward or upstream end 142 of the divider member 72 to facilitate up and down positioning of the divider member 72 and thereby decrease or increase the relative volume of air to be diverted. After the desired position of the member 72 is established the forward end 142 may be secured by tightening nut 144 on bolt 146. The rearward end 148 of divider member 72 is also provided with a slot 150 to facilitate not only the up and down positioning of the member 72 but also the angular relationship of the rearward end 148 with respect to the forward end 142. The angular relationship may be selectively adjusted by pivoting the rearward end 148 about the bolt 146. After desired position of the rearward end 148 has been established, the rearward end 148 may be secured by tightening nut 152 on bolt 154. FIG. 10 illustrates the particular arrangement of the bolt 154 and nut 152 with the sidewall 156 of divider 72 and the conveyor tube 35.

FIGS. 11 and 12 illustrate further alternate embodiments of dividers which may be employed in conjunction with any of the dispersion tube embodiments. An important aspect of any divider which is to be mounted in a particulate material guiding tube is that the upstream end be substantially free of any sharp edges upon which the particulate material may hang. Consequently, with this in mind, each of the illustrated embodiments incorporates a rounded forward portion 142. In the embodiment illustrated in FIG. 11, hanging of any fibers 15 on the divider 72A is further deterred by the provision of a source of pressurized air from a suitable source to the chamber 160 for discharge through ports 162. In FIG. 12, the divider 72B is defined by a rotatable cylinder portion 164. The cylinder 164 may be mounted for free rotation with the air stream serving as the motivating source, or else the cylinder 164 may be positively rotated by suitable power motivating means such as gears 166 and motor 168. In any event, any fibers 15 that might otherwise hang on the upstream end of the divider 76B will be rotated away therefrom and projected back into the main fiber stream.

While only one separation point is shown in each of the illustrated embodiments, it will be understood that a plurality of separation points may be incorporated in a conveyor tube to further separate the fibers from a first diverted stream. It will also be understood that any of the illustrated dividers may be positioned externally of the guiding tube, in the manner illustrated in FIG. 6. It will be further understood that cooling means, such as the fluid passage 11 of FIG. 1 and/or the cool air introducing passage 132 of FIG. 6, may be employed at a point downstream of a divider in conjunction with the main or undiverted passage.

In the foregoing embodiments of this invention, or given specific apparatus of carrying out the method, the preferred means of directing the hot gaseous stream emanating from the attenuating burner and entrained attenuated fibers and of diverting the stream and carried fibers to separate a portion of the hot gases comprises a tunnel or guiding tube which constitutes a walled passage means surrounding and substantially confining the stream and entrained fibers along its length. And in this embodiment a curvilinear section in the guiding tube or means constitutes the mechanism of diverting the stream of hot gases and entrained fiber to deflect a portion of the hot gases and effect its separation. However, complete encirclement of the hot gaseous stream and entrained fiber is not essential, since the high velocity of the gases itself will carry the fibers, and the diversion of the gaseous stream and fibers can be achieved, although somewhat less effectively, simply by means of appropriately positioned deflecting bodies or surfaces to achieve separation of a portion of hot gases in keeping with the concept of this invention.

The following embodiments of this invention comprise additional means of carrying out the method thereof which do not rely upon centrifugal force or deflection induced by a curvilinear portion or section within the guiding tube as the mechanism of diverting and separating a substantial portion of the hot gases from the primary stream of hot gases containing the entrained fiber.

The straight tube embodiments of this invention, unlike the curved tube type which operate upon the physical phenomena of both centrifugal force and inertia, generally rely principally upon inertia of the heavier fiber to carry them past hot gas diverting means.

In the straight guiding tube embodiment of FIG. 13, the guiding tube 35E is positioned generally coaxial with the stream of hot gases and entrained fiber 36 and provided with a plurality of louver type apertures 170 opening into a plenum chamber 171. The hot gases are removed from the stream flowing the length of tube 35E through louvered apertures 170 and conveyed away by any suitable means such as blower fan 172. Of course the number and size of the apertures are constructed to enable the removal of any designed quantity of hot gases in relation to the overall system capacity. The thermosetting binder 48, or any thermally sensitive material is thereafter applied to the fiber entrained within the remaining gases of the blast 34 and the binder containing fiber collected on belt 38 as mat 40.

FIG. 14 illustrates a relatively uninvolved construction for the by-passing of a portion of the hot gases from the flame blast 34 comprising one or more openings 173 located intermediate guiding tube 35F. Hot gases can be withdrawn from the blast stream 34 through the several openings 173, here positioned in the lower portion of tube 35F although other positions will suffice, by means of fans or any appropriate device. The withdrawn hot gases and any entrained fiber or fines can be directed through conduit 191 to the fiber collection belt and suction box wherein the entrained fiber or fibers are recovered. Following removal of a portion of the hot gases and reduction of the heat content, the thermally activated binder 48 is applied and the fiber formed into a mat on belt 38. One means of removing hot gases comprises utilizing the static pressure within the tube which is at a maximum just beyond the burner 14, and drops progressively down the length of the tube. Thus the static pressure alone will force hot gases out through openings such as illustrated by 173.

The embodiment of FIG. 15 employs baffle-like sections 174 or deflectors within guiding tube 35G, coupled with extended outlet openings 175, to divert the fiber content of the blast 34 of hot gases away from the cooperating hot gas outlets whereby substantial portions of the hot gases can be separated from the main stream and bypassed by removal through outlets 175 into for example a plenum chamber 176 by means of a fan or other appropriate device connected through conduit 177. The baffle-like sections 174 or deflectors may be constructed integrally with the tube 35G as illustrated, or may constitute an added unit, either fixed or adjustable.

The variation of FIG. 16 has hot gas by-pass means in the form of a series of orifices 178 dispersed about the wall of tube 35H and opening into plenum chamber 179 communicating with fans 180 and 180'. Thus a substantial amount of the hot gases of the blast 34 emanating from burner 14 are relatively uniformly withdrawn from all about the stream without interfering with the path or distribution of the fiber flow which upon application of binder 48 from spray nozzle 46, is collected on belt 38.

In FIG. 17, the blast 34 from burner 14 carrying the entrained attenuated fiber passes through tube 35I provided with a roughened surface 181 such as formed by corrugating the tube 35I or otherwise effecting a series of minor projections on its inner surface. The roughened surface 181 slows down the flow of gases adjacent thereto while the velocity of the gas stream opposite the rough surface 181 is increased due to less friction and with the velocity greater opposite the rough surface 181 than adjacent thereto, the pressure is therefore less in the lower half of the tube 35I, or opposite to surface 181 whereby the fibers within the stream move down and are separated by being discharged through lower outlet 185 while a substantial portion of the hot gases are exited through upper outlet 186. Also, this device is optionally provided with an additional hot gas by-pass comprising a plurality of small orifices 182 located generally opposite the roughened surface 181 and communicating with an exhaust fan 184 through plenum chamber 183.

FIG. 18 illustrates a variation and means of practicing the invention wherein the fiber content of the blast 34 issuing from burner 14 is deflected from its initial path by attraction of an opposite, or conversely repelled by a like electrical charge. For example, glass exhibiting a negative charge, as shown in FIG. 18, the attenuated glass fiber content entrained within the stream of hot gases is deflected downwardly toward the lower positively charged plate 188, as opposed to the corresponding upper negatively charged plate 189, and thereby ejected out lower exit 189 while a substantial portion of the hot gases leaves through bypass outlet 190 exhausting high quantities of heat prior to the application of binder 48 and collection of the binder containing fiber on belt 38 and formation of mat 40.

It will be understood that the foregoing details are given for purposes of illustration, not restriction, and that the variations within the spirit of this invention are intended to be included within the scope of the appended claims.

What I claim is:

1. A method of preventing precuring of binder in the production of mineral fiber bodies comprising:
    (a) forming and suspending particulate mineral fibers in a hot gaseous stream;
    (b) directing the hot gaseous stream carrying the suspended particulate mineral fibers to collection means for the particulate mineral fibers;
    (c) separating a substantial portion of the hot gases from the remaining portion of the hot gaseous stream carrying the suspended particulate mineral fibers to the collection means;
    (d) introducing a heat sensitive binder material into the remaining portion of the hot gaseous stream to apply said heat sensitive binder material to the suspended particulate mineral fibers carried within the said remaining portion of the hot gaseous stream; and,
    (e) collecting the suspended particulate mineral fibers and applied heat sensitive binder material from the remaining portion of the hot gaseous stream.

2. The method of claim 1 wherein the particulate mineral fibers are glass fibers.

3. A method of preventing precuring of binder in the production of bonded mineral fiber bodies comprising:
    (a) flame blast attenuating mineral fibers with a flame producing a stream of hot gases, and suspending the attenuated mineral fibers within the stream of hot gases and conveying the suspended fibers within the stream towards a fiber collection means;
    (b) guiding the stream of hot gases and suspended attenuated mineral fibers in a controlled path initially generally coaxial with the stream of hot gases emanating from the flame blast;
    (c) diverting the guided stream of hot gases suspending and conveying the fiber from its initial path generally coaxial with the flame blast and thereby deflecting a substantial portion of the hot gases and separating the deflected portion of the hot gases from the stream of the remainder of hot gases and the suspended fiber;
    (d) applying a heat curable binder material to the fibers suspended in the stream of the remaining portion of hot gases; and,
    (e) collecting the suspended mineral fibers containing the heat curable binder material from the remaining portion of the suspending hot gases.

4. In the method of claim 3 comprising introducing gas to cool the diverted stream of hot gases suspending and conveying the fibers.

5. A method of preventing precuring of binder in the production of bonded glass fiber felted bodies comprising:
    (a) flame blast attenuating glass fibers with flame producing a stream of hot gases, and suspending the attenuated glass fibers within the stream of hot gases and conveying the suspended fibers within the stream of hot gases towards a fiber collection means;
    (b) confining the stream of hot gases and suspended attenuated glass fibers in a controlled path initially generally coaxially with a stream of hot gases emanating from the flame blast;
    (c) diverting the confined stream of hot gases suspending and conveying the fibers from its initial path generally coaxially with the stream of hot gases emanating from the flame blast and thereby deflecting a substantial portion of the hot gases from the major remaining portion of the hot gases containing the suspended fibers and separating the deflected substantial portion of hot gases from the confined stream of the remaining major portion of hot gases and suspended fibers;
    (d) discharging the deflected and separated substantial portion of hot gases from the confined stream;
(e) applying thermosetting resin binder to the fibers suspended in the stream of the remaining major portion of the hot gases; and,
(f) collecting the fibers containing the thermosetting resin from the remaining major portion of the hot gases.

6. Apparatus for producing mineral fiber bodies comprising:
(a) means for generating a gaseous stream of high temperature and high velocity for forming and carrying in suspension particulate mineral fibers;
(b) guiding means positioned to receive the gaseous stream and suspended particulate mineral fibers and control the path of the gaseous stream carrying the suspended particulate mineral fibers;
(c) means combined with the guiding means for separating a portion of the hot gases from the remaining portion of the hot gaseous stream carrying the suspended particulate mineral fibers within the guiding means;
(d) means for introducing a heat sensitive binder material into the remaining portion of the hot gaseous stream and applying said heat sensitive binder material to the suspended particulate mineral fibers; and,
(e) means for collecting the suspended mineral fibers and applied heat sensitive binder material from the remaining portion of the hot gaseous stream.

7. Apparatus for the production of glass fiber felted bodies comprising:
(a) means for feeding glass filaments;
(b) burner means for producing a glass fiber attenuating blast and stream of hot gases for suspending and conveying the attenuated fibers to a fiber collecting means;
(c) means for guiding the stream of hot gases and suspended attenuated fibers in a controllable path initially generally coaxially with the stream of hot gases emanating from the burner;
(d) said means for guiding the stream of hot gases and suspended attenuated fibers being curved to divert the confined stream of hot gases and suspended fiber from the initial path generally coaxially with the stream of hot gases emanating from the burner and to deflect a portion of the hot gases from the remaining stream of hot gases and suspended fiber;
(e) means for separating the deflected hot gases from the remaining stream of hot gases and the guiding means;
(f) means for applying heat curable binder to the fiber suspended in the stream of remaining hot gases; and,
(g) means for collecting the fiber containing the heat curable binder from the remaining stream of suspending hot gases.

8. The apparatus of claim 7 provided with means for applying gas to the guided stream of hot gases and suspended attenuated fibers to cool the guided stream of hot gases and suspended fibers.

9. Apparatus for the production of resin bonded glass fiber felted bodies comprising:
(a) means for feeding glass filaments;
(b) burner means for producing a glass fiber attenuating blast and stream of hot gases for suspending and conveying the attenuated fibers;
(c) a tubular member having its inlet position adjacent to the burner means and initially generally coaxially aligned with the blast and stream of hot gases emanating from the burner means and having its outlet directed towards a fiber collection means, to confine and control the path of the stream of hot gases emanating from the burner and carrying the suspended fiber;
(d) said tubular member being curved to divert the confined stream of hot gases and suspended fibers carried therein and to deflect a portion of the hot gases from the remaining stream carrying the suspended fibers and having a dividing member associated with said tubular member cooperating with the said curve to separate the deflected portion of the hot gases from the remaining stream and suspended fibers;
(e) means for applying a thermosetting resin binder to the suspended fiber being positioned adjacent to the tubular member outlet; and,
(f) means for collecting the fiber containing the thermosetting resin binder from the remaining suspended stream of hot gases.

10. The apparatus of claim 9 wherein the tubular member is provided with means to apply gas to the stream of hot gases and suspended fibers to deflect the suspended fibers.

11. Apparatus for the production of resin bonded glass fiber felted bodies comprising:
(a) means for feeding glass filaments;
(b) burner means for producing a glass fiber attenuating blast and stream of hot gases for suspending and conveying the attenuated fiber;
(c) tubular means having its inlet position adjacent to the burner means and being generally axially aligned with the blast and stream of hot gases emanating from the burner means and its outlet directed towards a fiber collection means, to confine and control the path of the stream of hot gases emanating from the burner and carrying the suspended fibers;
(d) said tubular means being provided with at least one orifice intermediate its inlet and outlet to separate and discharge a portion of the hot gases from the remaining stream of hot gases and suspended glass fibers;
(e) means for applying a thermosetting resin binder to the suspended fibers positioned adjacent to the tubular member outlet; and,
(f) means for collecting the fiber containing the thermosetting resin binder from the remaining suspended stream of hot gases.

12. The apparatus of claim 11 wherein the tubular member is substantially straight.

13. The apparatus of claim 11 wherein the tubular member is provided with at least one baffle member combined with the orifice to separate and discharge a portion of the hot gases from the remaining stream of hot gases and suspended fibers.

References Cited

UNITED STATES PATENTS

| 2,822,579 | 2/1958 | Silverman. |
| 2,647,851 | 2/1952 | Schwartz. |
| 3,006,797 | 10/1961 | Labino 65—31 |
| 3,049,172 | 8/1962 | Labino. |
| 3,089,538 | 5/1963 | Labino. |

DONALL H. SYLVESTER, Primary Examiner.

ROBERT L. LINDSAY, JR., Assistant Examiner.

U.S. Cl. X.R.

18—2.5; 34—57; 65—5, 9, 16; 264—12